March 22, 1932. J. A. BUNDY ET AL 1,850,445
CAB FOR VEHICLES
Filed March 14, 1930
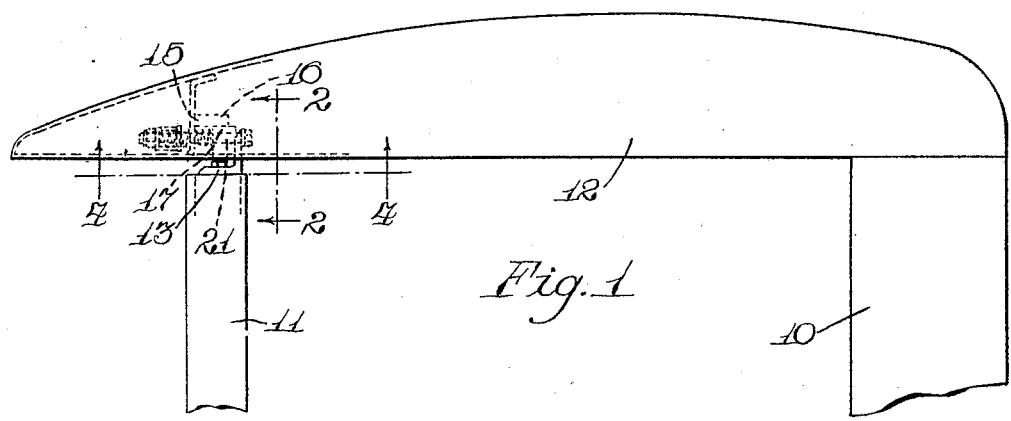
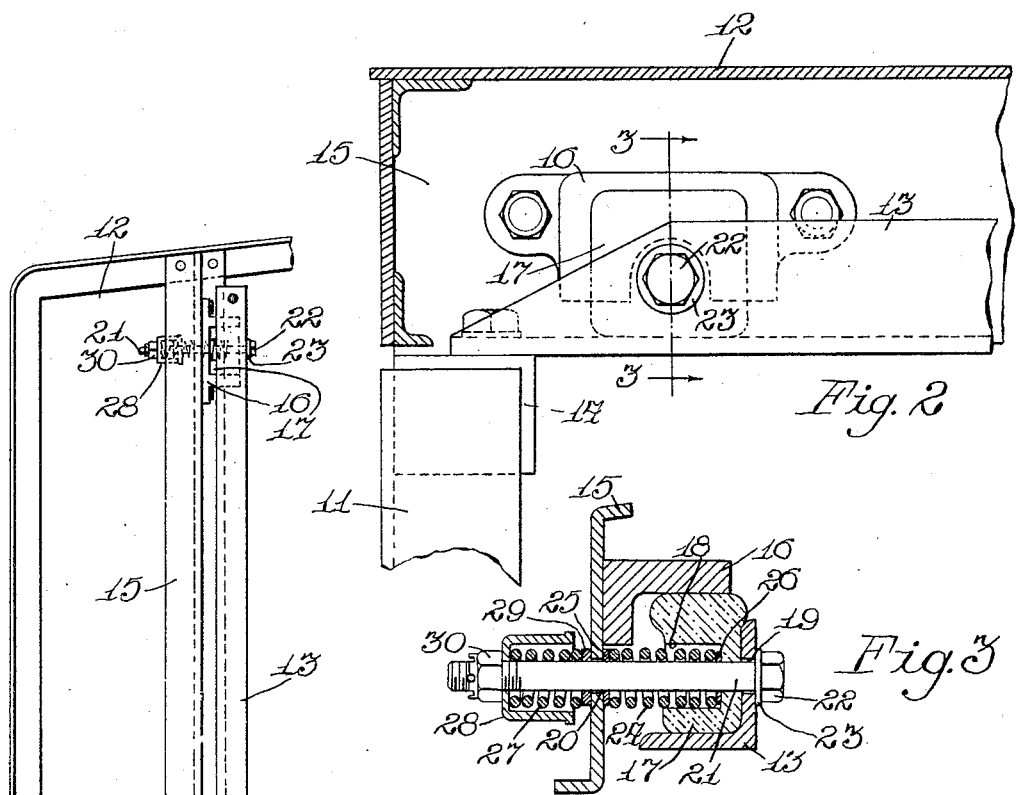
Inventors.
James A. Bundy
John Salzer
and Julius H. Moritz
By H. P. Doolittle,
Att'y.

Patented Mar. 22, 1932

1,850,445

UNITED STATES PATENT OFFICE

JAMES A. BUNDY, JOHN SELZER, AND JULIUS H. MORITZ, OF FORT WAYNE, INDIANA, ASSIGNORS TO INTERNATIONAL HARVESTER COMPANY, A CORPORATION OF NEW JERSEY

CAB FOR VEHICLES

Application filed March 14, 1930. Serial No. 435,771.

This invention relates to improvements in cab bodies for vehicles and especially to cabs for motor trucks. In such cabs it has been proposed to provide a flexible or cushioned connection between the cab top or roof and the windshield structure because of wearing of the cab, when the chassis is strained and twisted due to travel over uneven ground, has caused forces to be transmitted through these parts, frequently causing windshield breakage, which is not only objectionable but creates a situation involving great danger to the driver.

More particularly, therefore, the present invention relates to an improved form of cushioned connection between a cab top and windshield structure.

The objects of the invention are generally to improve cab structures for motor vehicles; to provide an improved form of cushion connection between a windshield and cab top; and, to provide such connection or connections of simple, inexpensive construction and adaptable for use in standard cabs without in any way altering their conventional appearance or requiring any radical structural changes therein.

Other objects will become apparent to those skilled in this art as the disclosure of the invention is hereinafter more fully made.

Such objects may be achieved by the structure herein illustrated and described representing a practical example of the invention, which example may comprise a combination rubber block and spring assembly mounted between a cross support carrying the cab on top of the windshield structure and a cross member forming part of the top or roof, said resilient structure being so constructed and arranged as to permit both transverse and fore and aft play between the roof and windshield structures.

In the drawings:

Figure 1 is a side elevational view of the upper part of a cab structure;

Figure 2 is an enlarged detail view, partly in section, as seen from the rear along the section line 2—2 appearing in Figure 1;

Figure 3 is a longitudinal sectional view through a resilient connection as seen along the line 3—3 appearing in Figure 2 when viewed in the direction indicated by the arrows; and, Figure 4 is a bottom view of the front end of the cab shown in Figure 1, as viewed along the line 4—4 shown in Figure 1.

The improved cab is generally shown at 10 and the front corner posts of the windshield structure at 11, while the top or roof is shown at 12.

These posts 11, of which there will be one at each corner, have secured thereto in any appropriate manner, a cross angle support 13 with one flange thereof disposed vertically. If desired, a fabric or other insert 14 may be inserted between the posts and cross support to form an anti-squeak joint. Spaced slightly forwardly of this cross support 13, the cab roof is provided with a vertically disposed cross member 15 presenting a vertically disposed face, which has secured thereto on its rear side and adjacent each end a channel shaped bracket 16 closed at its top and open at its bottom to form box-like rests which extend laterally with respect to the member 15. These rests are set on non-metallic elastic blocks 17, such for example as rubber which are carried by the angle cross support 13. The connections thus far described permit a transverse relative movement, under strain, between the cab roof and support 13 in an obvious manner.

Each elastic block or cushion 17 is bored out a distance as at 18, each bore 18 registering with aligned holes 19 in the vertical flange of the cross support 13 and similar aligned holes 20 in the cross member 15. Loosely passed through these holes and the elastic block is a bolt 21 having a head 22, there being a washer 23 arranged between the head 22 and support 13 to close the opening 19. A coil spring 24 encircles the portion of the bolt 21 between the two cross members 13 and 15, the spring fitting into the bore 18 of the elastic block 17 and between thrust washers 25 and 26, as shown. That portion of the bolt 21 located forwardly of the cross member 15 carries an encircling coil spring 27 housed in a cap 28, against which the spring abuts at one end. At its other end, the spring thrusts against a washer 29, closing the opening 20 in the cross member 15. A nut 30 threaded to the free end of the bolt holds the assembly together. This cushion structure obviously permits of a yielding fore and aft relative movement between the cab roof and windshield structure.

In operation, it will now be apparent that the cushion devices when arranged and located as above described provide that necessary yield between the parts in lateral and fore and aft directions which will prevent binding between the cab top and windshield structure to prevent breakage of the windshield and provide greater safety to the driver as a result.

The invention thus provides structure which achieves all of the desirable objects heretofore recited. It is the intention to cover all such changes and modifications of the form herein chosen for purposes of illustration as do not materially depart from the spirit and scope of the invention as indicated by the appended claims.

What is claimed is:

1. A cab comprising, in combination, a top having a transverse cross member, a windshield structure including a transverse cross support, and a yielding connection between the member and support, said connection comprising an elastic block carried by the support and a rest on the member set on the block whereby to carry the said member on the elastic block.

2. A cab comprising, in combination, a top having a transverse cross member provided with a vertically disposed face, a windshield structure including a transverse cross support, said support being an angle iron having a horizontally disposed flange, and a yielding connection between the member and support, said connection comprising an elastic block set on the horizontal flange of the cross support and a bracket secured to the vertical face of the cross member and extending laterally thereof, said bracket embracing and resting loosely on the elastic block.

3. A cab comprising, in combination, a top and a windshield structure, the top having a transverse member and the windshield structure having a transverse support, the member and support being spaced horizontally in parallel relationship, and a connection between the member and support to permit relative movement between the two, said connection comprising a block of yielding material carried on the support, and a bracket carried by the member which rests on the upper sides of said block only to support the cab top.

4. A cab comprising, in combination, a top and a windshield structure, the top having a transverse member and the windshield having a transverse support, the member and support being spaced in parallel relationship, and a connection between the member and support to permit relative movement between the two, said connection comprising a block of yielding material carried on the support, a bracket carried by the member and resting on said block to support the top, a bolt passed loosely in a fore and aft direction through the cross member, support and the yielding material, and a spring encircling the bolt and located between the member and yielding material.

5. A cab comprising, in combination, a top having a transverse cross member, a windshield structure including a transverse cross support, a yielding connection between the member and support, said connection comprising a block of rubber carried by the support, a bolt connecting the member, support and rubber block, and a spring encircling the bolt between the member and support, and means for resting the member on the block to support the top.

6. A cab comprising, in combination, a top having a transverse cross member, a windshield structure including a transverse cross support, a yielding connection between the member and support, said connection comprising a block of elastic non-metallic material carried by the support, said block having a bore therein, a bolt passed through the block and loosely passed through the member and support, a coil spring encircling the bolt and arranged in the bore of the block between the member and support, and means for resting the member on the block to support the top.

7. A cab comprising, in combination, a top having a transverse cross member, a windshield structure including a transverse cross support, a yielding connection between the member and support, said connection comprising a block of elastic non-metallic material carried by the support, said block having a bore therein, a bolt passed through the block and loosely passed through the member and support, a coil spring encircling the bolt and arranged in the bore of the block between the member and support, a second coil spring encircling a protruded end of the bolt on the other side of the member, a cap for said last mentioned spring, and means for resting the member on the block to support the top.

8. A yielding connection between a transverse member and a parallel, spaced, transverse support, said connection comprising the combination of a block of non-metallic elastic material, a bolt passed through the member, support, and material, a pair of springs encircling the bolt, one on each side of the member, one of said springs arranged within a bore in the material, and a bracket extending from the member for resting the member loosely on the material.

9. A cab comprising, in combination, a top having a transverse cross member presenting a vertical face, a windshield structure including a transverse cross support lying in substantially the same horizontal plane with the cross member, said member and support arranged in parallelism with the latter having a horizontal flange substantially but not completely occupying the space between said support and member, a block of yielding elastic material carried on the said flange, and an inverted box-like bracket connected to the vertical face of the member, said bracket resting loosely on top of and embracing the upper portion of said block.

In testimony whereof we affix our signatures.

JAMES A. BUNDY.
JOHN SELZER.
JULIUS H. MORITZ.